US005923515A

United States Patent [19]

Eubanks et al.

[11] Patent Number: 5,923,515

[45] Date of Patent: Jul. 13, 1999

[54] BATTERY PROTECTION FUSE ASSEMBLY

[75] Inventors: Gerald W. Eubanks, Dallas; Michael C. Steeves, Garland, both of Tex.

[73] Assignee: Lucent Technologies Inc., Murray Hill, N.J.

[21] Appl. No.: 09/013,582

[22] Filed: Jan. 27, 1998

[51] Int. Cl.$^6$ .......... H02H 5/04

[52] U.S. Cl. .......... 361/104; 361/57; 337/221

[58] Field of Search .......... 361/104, 111, 361/57; 379/412; 340/638; 337/144, 150, 161–162, 164, 168, 178, 206, 217, 219, 221–222, 229–230, 241, 293

[56] References Cited

U.S. PATENT DOCUMENTS

| | | | |
|---|---|---|---|
| 4,186,365 | 1/1980 | Fahnoe | 337/206 |
| 4,308,515 | 12/1981 | Rooney et al. | 337/162 |
| 4,417,224 | 11/1983 | Ross | 337/164 |
| 4,661,807 | 4/1987 | Panaro | 340/638 |
| 5,345,210 | 9/1994 | Swensen et al. | 337/163 |
| 5,781,095 | 7/1998 | Dietsch et al. | 337/243 |

*Primary Examiner*—Michael J. Sherry

[57] ABSTRACT

A protection device for an electrical circuit comprises a housing assembly, a fuse support structure that is comprised of a conductive material and that can be coupled to the housing assembly, a main fuse that can be mounted to the fuse support structure to receive a flow of current therefrom and a trip fuse mechanically mounted to the main fuse by electrical contacts. The electrical contacts not only secure the trip fuse to the main fuse, but also provide a conductive path across the main fuse and through the trip fuse. In some embodiments, a momentary switch may be coupled to the trip fuse. In such instances, the trip fuse is configured to activate the momentary switch when a predetermined excessive current flows through the trip fuse and may be electrically connected to a current indicator that indicates when the excessive current flows through the trip fuse.

30 Claims, 3 Drawing Sheets

BATTERY PROTECTION FUSE ASSEMBLY

TECHNICAL FIELD OF THE INVENTION

The present invention is directed, in general, to a protection fuse assembly and, more specifically, to a battery protection fuse assembly having a main fuse and a trip fuse mounted to and supported by the main fuse.

BACKGROUND OF THE INVENTION

The traditional reliability of telecommunication systems that users have come to expect and rely upon is based in part on the systems'operation on redundant equipment and power systems. Telecommunication switching systems, for example, route tens of thousands of calls per second. The failure of such systems, due to either equipment breakdown or loss of power, is unacceptable since it would result in a loss of millions of telephone calls and a corresponding loss of revenue.

Power distribution systems such as battery plants address the power loss problem by providing the telecommunication system with a secondary source of power, a battery, in the event of the loss of a primary source of power. Battery plants operate generally as follows. Each battery plant includes batteries, rectifiers, protection devices (e.g., circuit breakers or fuses), and other power distribution equipment (e.g., cabling). Due to the enormous size of the equipment, the batteries are generally located in a battery room, while the rectifiers are located in a power center, some distance away. The primary power source is produced by the rectifiers, which convert an AC line voltage into a DC voltage, to power the load and to charge the batteries. The primary power source may become unavailable due to the loss of the AC line voltage or the failure of the rectifiers. In either case, the batteries then supply power to the load. The protection devices provide protection from excessive current conditions caused by short circuits or other malfunctions, either in the load or in the battery plant.

Protection devices, such as fuses, are typically placed in the power center to protect the rectifiers from high current conditions. The failure of a particular rectifier due to an internal short circuit, for instance, trips the fuse, effectively isolating the failed rectifier from the system. The batteries, however, are not similarly protected. Failures in the distribution system, due to cable damage, for instance, may result in a short circuit across the batteries. Internal failures within the batteries may also result in a short circuit condition. Since the batteries are not protected, the high currents resulting from the short circuit may cause the batteries to become a fire hazard.

Accordingly, what is needed in the art is a protection device employable to protect the batteries in a power distribution system. Further, what is needed is an apparatus for detecting high current fault conditions (e.g., short circuits) in the batteries.

SUMMARY OF THE INVENTION

The present invention provides a protection device for an electrical circuit that comprises a housing assembly, a fuse support structure that is comprised of a conductive material and that can be coupled to the housing assembly, a main fuse that can be mounted to the fuse support structure to receive a flow of current therefrom and a trip fuse mechanically mounted to the main fuse by electrical contacts. The electrical contacts not only secure the trip fuse to the main fuse, but also provide a conductive path across the main fuse and through the trip fuse, thereby eliminating the need for wires. In some embodiments, a momentary switch may be coupled to the trip fuse. In such instances, the trip fuse is configured to activate the momentary switch when a predetermined excessive current flows through the trip fuse. Additionally, the trip fuse may be electrically connected to a current indicator that indicates when the excessive current flows through the trip fuse.

Thus, the present invention provides a more compact fuse configuration that is easy to replace and versatile in the way in which it can be connected to a power source, such as a battery rack. Moreover, since the trip fuse is mounted on and supported by the main fuse, both fuses can be easily and simultaneously replaced by removing the main fuse from the fuse support structure, and wire from the main fuse to the trip fuse are eliminated, which may reduce failure of the indicator device when excessive electrical current flow through the trip fuse.

In one embodiment, the housing may be a hollow cylindrical housing configured to receive the fuse support structure therethrough. In such embodiments, the fuse support structure may include a substantially planar busbar assembly that has opposing ends and a circular member near each of the opposing ends which has a diameter that is less than an interior diameter of the hollow cylindrical housing so that the fuse support structure can be inserted into the cylindrical housing. In another aspect of this embodiment, the opposing ends of the cylindrical housing are threaded and the cylindrical housing further includes threaded caps that have openings therein. The threaded caps are configured to engage the circular members to secure the fuse support structure within the cylindrical housing.

In another embodiment, the above-described protection device may be used in a power distribution center that includes a power center having a power center fuse electrically connected thereto near the power center, wherein the power center is electrically connectable to a power source external to the power distribution system, and a battery power center electrically connected to the power center, wherein the battery power center, which includes the above-described protection device, provides a current to the power center when an interruption of current from the power source external to the power distribution system occurs.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
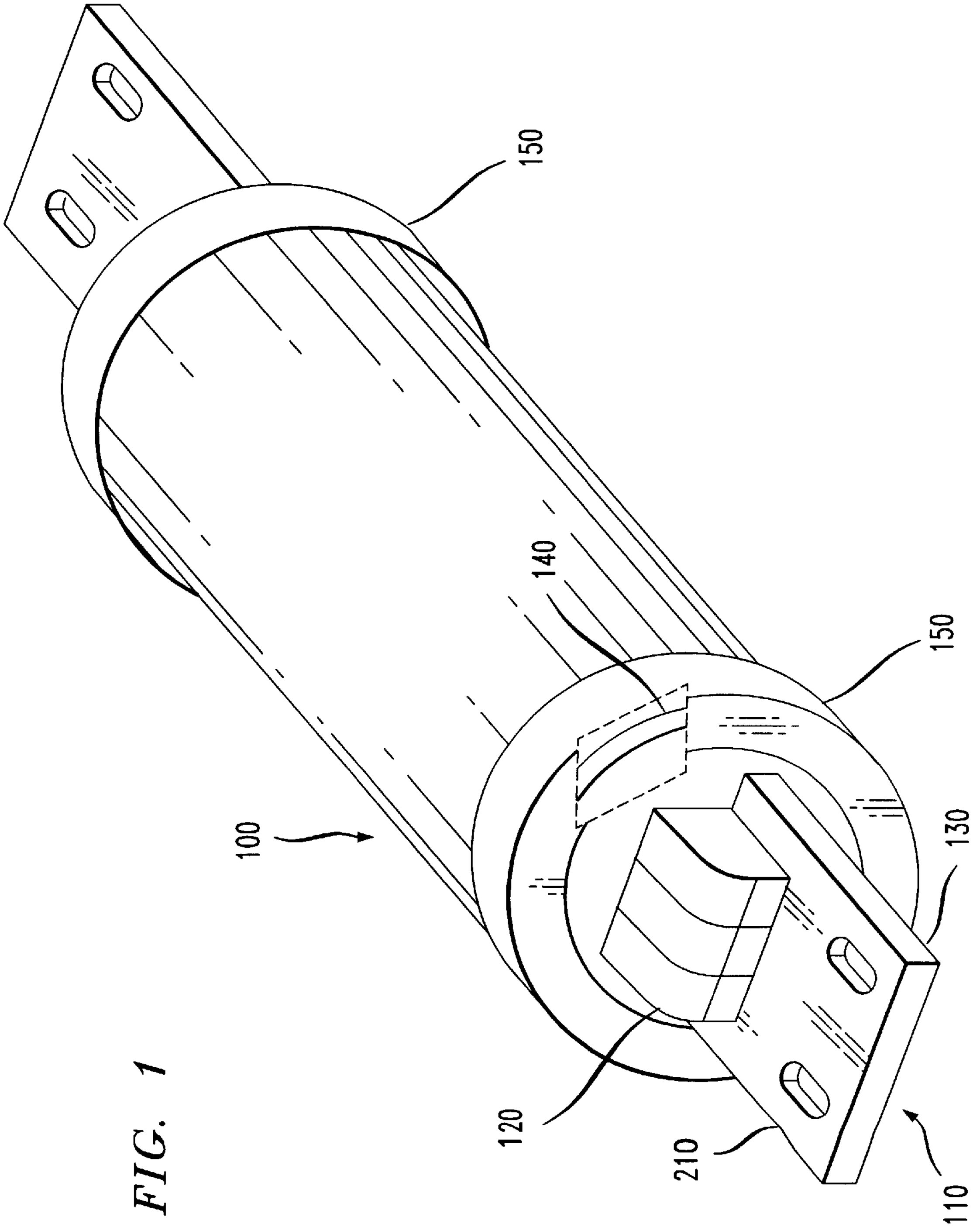
FIG. 1 illustrates a perspective view of an exemplary embodiment of a housing assembly in which fuses may be contained.

Referring initially to FIG. 1, illustrated is a perspective view of an exemplary embodiment of a housing assembly, which in one particular embodiment may be a cylindrical housing, 100 in which fuses may be contained. The housing assembly 100, is coupled to a fuse support structure 110. A block terminal 120 is mounted to the fuse support structure 110, to provide a connection point for a remote current indicator that will be described further with respect to FIG. 2.

In one embodiment, the fuse support structure 110 consists of a substantially planar busbar assembly 130 having opposing ends and a circular member 140 near to each of the opposing ends. The circular members 140 have a diameter less than an interior diameter of the housing assembly 100 to enable the fuse support structure 110 to be inserted through the housing assembly 100 and secured thereto. In the illustrated embodiment, the fuse support structure 110 is composed of a conductive material. In an advantageous embodiment, the fuse support structure 110 may be composed of aluminum. Those skilled in the art should realize, however, that the use of other conductive materials is well within the broad scope of the present invention.

The housing assembly 100 is preferably substantially cylindrical and hollow, having opposing ends that are threaded. The housing assembly 100 is configured to receive and house the fuse support structure 110. Further, the housing assembly 100 includes threaded caps 150 having openings therein, which are described below with reference to FIG. 3. In the illustrated embodiment, the openings have inside diameters that are less than the diameter of the circular members 140. The threaded caps 150 thus receive only a portion of the fuse support structure 110 therethrough. The threaded caps 150 screw onto the threaded ends, 10 engaging the circular members 140 and securing the fuse support structure 110 within the housing assembly 100. Of course, it is readily apparent to those of ordinary skill in the art that the caps 150 may be mechanically secured to the housing assembly 100 in various ways.

Figure 2:
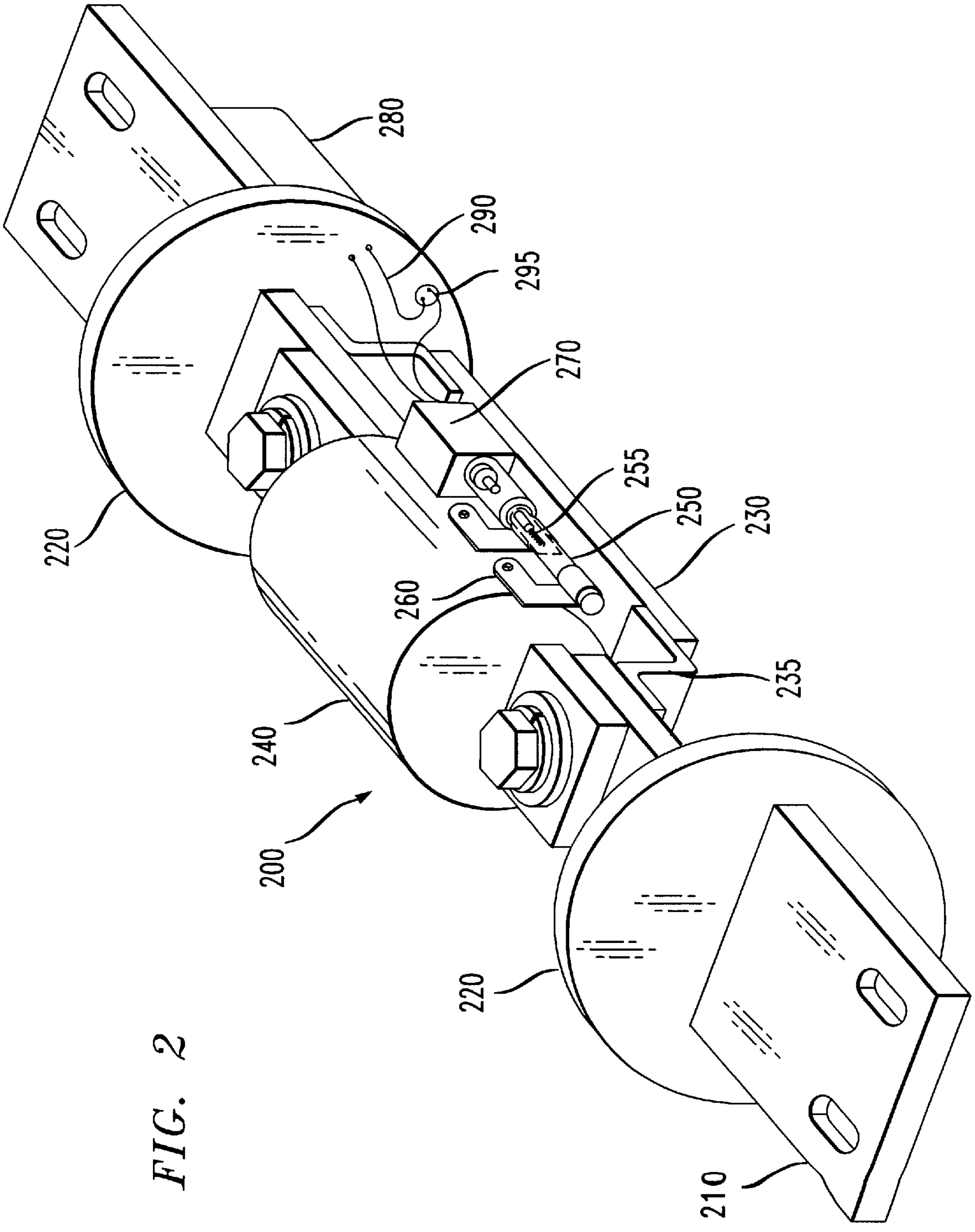
FIG. 2 illustrates a perspective view of a fuse support structure having a fuse system mounted thereon and that may be inserted through the housing assembly.

Turning now to FIG. 2, illustrated is a perspective view of a fuse support structure 200 having a fuse system mounted thereon and that may be inserted through the housing assembly 100 of FIG. 1. The fuse support structure 200 includes a substantially planar busbar assembly 210, having opposing ends and a circular member 220 near each of the opposing ends. In an advantageous embodiment, the circular member 220 is frictionally coupled to the busbar assembly 210. Those skilled in the art should understand, however, that other conventional methods of mechanically coupling the circular member 220 to the busbar assembly 210 may also be used. For instance, the circular member 220 may be welded onto the busbar assembly 210, or alternatively, it may be integrally formed with the busbar assembly 210. The fuse support structure 200 further includes a sub-support structure 230, coupled thereto. In the illustrated embodiment, the sub-support structure 230 is coupled to the fuse support structure 200 via metal brackets 235. Alternatively, other conventional mechanical mounting methods may be used. The sub-support structure 230 enhances a structural integrity of the fuse support structure 200 when the fuse system is removed. In an advantageous embodiment, the sub-support structure 230 is composed of an electrically insulating material thereby preventing current flow between the busbar assemblies 210, except through the fuse system.

The fuse system includes a main fuse 240, mounted on the fuse support structure 200 by conventional methods. As used herein, the term “fuse” includes any current interruption device that interrupts the flow of current through the device when the current exceeds a predetermined amperage threshold, such as conventional fuses or circuit breakers. In the illustrated embodiment, the main fuse 240 is mechanically mounted using bolts, lock washers, and washers. Of course, other well known methods for securing fuses to a structure may also be used. The main fuse 240 is electrically connected to the fuse support structure 200 to carry a current flow received therefrom. The fuse system further includes a trip fuse 250 that is mechanically mounted to the main fuse 240 by electrical contacts 260. In the illustrated embodiment, the electrical contacts 260 are screwed into main fuse 240, forming a conductive path across the main fuse 240 and through the trip fuse 250. Of course, other methods of mechanically and electrically coupling the trip fuse 250 to the main fuse 240 may also be used. The fuse system further includes a momentary switch 270, of conventional design that is mechanically coupled to the trip fuse 250. In an advantageous embodiment, the momentary switch 270 contains an isolated, form C contact. Of course, the present invention does not require the use of momentary switches. Those skilled in the art will realize that other types of switches may also be employed. The fuse system further includes a block terminal 280, having first and second contacts (not shown), mechanically mounted to the fuse support structure 200 via conventional methods, and electrically coupled to the trip fuse 250. In the illustrated embodiment, the block terminal 280 is electrically coupled to the trip fuse 250 via the momentary switch 270 and conductive wire 290. The fuse system may further include an LED 295, mounted to the circular member 220 of the fuse support structure 200, that provides a visual indication of an operational status of the fuse system. In the illustrated embodiment, the LED 295 is series-coupled between the momentary switch 270 and the block terminal 280. Those skilled in the art should realize, however, that the LED 295 is not integral to the practice of the present invention. A controller (not shown) provides a remote current indicator signal, electrically coupled to the block terminal 280, to monitor the fuse system from a remote location.

In an illustrative embodiment, the fuse system functions as follows. Normally, current flows through the busbar assembly 210 of the fuse support structure 200 and through the main fuse 240. A voltage from the remote current indicator is applied to the first contact of the block terminal 280. The momentary switch 270 is normally open, however, so current from the remote current indicator does not flow through either the momentary switch 270, the LED 295, or the block terminal 280.

The main fuse 240 is designed to carry a specified amount of current. For example, the main fuse 240 may be designed to carry 600 Amps. Of course, the main fuse 240 may be sized for any current, as required by various applications. A predetermined excessive current flow (greater than the specified current) through the main fuse 240 will cause it to “trip” or open. Once the main fuse 240 trips, current can no longer flow through the main fuse 240. Current must, therefore, flow through the trip fuse 250. The trip fuse 250, however, has a substantially lower current carrying capacity than the main fuse 240. For example, the trip fuse 250 may be designed to carry 0.5 Amps. Of course, the trip fuse 250 may carry any current that is substantially lower than that of the main fuse 240. The trip fuse 250, therefore, "trips" or opens immediately after the main fuse 240 opens.

In the illustrated embodiment, the trip fuse 250 contains a spring plunger 255 that is released when the trip fuse 250 trips. When released, the spring plunger 255 presses down on the normally open momentary switch 270, maintaining the momentary switch 270 in a closed state. The trip fuse 250 thus activates the momentary switch 270 when the predetermined excess current flows through the trip fuse 250. Of course, other methods of activating the momentary switch 270 by the trip fuse 250 in response to the tripping of the main fuse 240 may also be used.

Current from the remote current indicator now flows from the first contact of the block terminal 280, through the LED 295 and the momentary switch 270, to a second contact of the block terminal 280. The LED 295 lights and the remote current indicator may now be sensed at the second contact of the block terminal 280. The presence of the remote current indicator at the second contact of the block terminal 280 signifies that excessive current has flowed through the trip fuse.

Of course, those skilled in the art will realize that the momentary switch 270 may be normally closed. In this embodiment, current from the remote current indicator continually flows from the first contact of the block terminal 280, through the LED 295 and the momentary switch 270, to the second contact of the block terminal when the fuse system is in operation. When the main fuse 240 trips, the spring plunger 255 opens the momentary switch 270, removing the remote current indicator from the LED 295 and the second contact of the block terminal.

In either embodiment, the fuse system provides a protective device that is capable of notifying the user of the occurrence of a fault condition.

Figure 3:
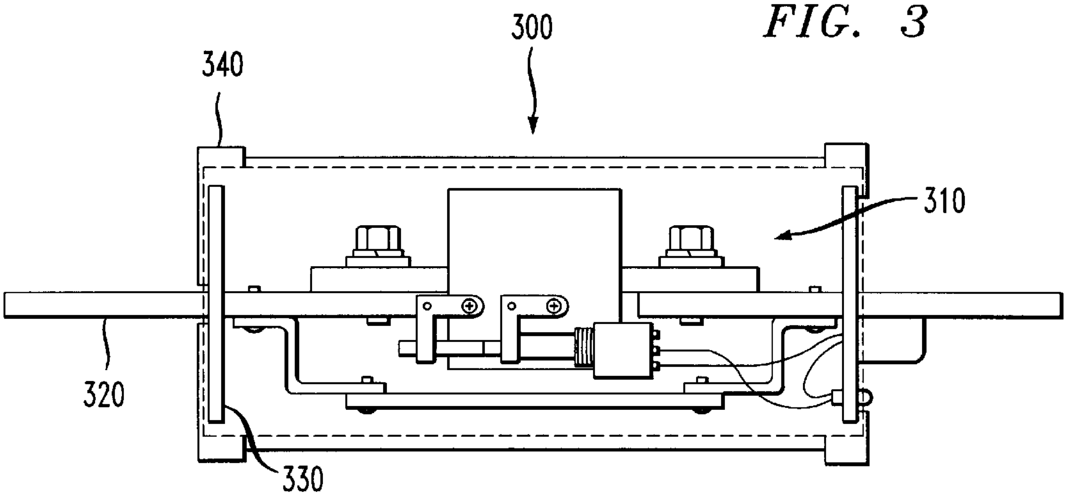
FIG. 3 illustrates a cross-sectional view of a housing assembly with a fuse support structure inserted therein.

Turning now to FIG. 3, illustrated is a cross-sectional view of a housing assembly 300 with a fuse support structure 310 inserted therein. The housing assembly 300 is substantially cylindrical and hollow, with threaded ends. The fuse support structure 310 consists of a substantially planar busbar assembly 320 having opposing ends and a circular member 330 near to each of the opposing ends. The circular members 330 have a diameter less than an interior diameter of the housing assembly 300 to enable the fuse support structure 310 to be inserted through the housing assembly 300. Threaded caps 340, having openings with inside diameters less than the diameter of the circular members 330, screw onto the threaded ends to secure the fuse support structure 310 within the housing assembly 300. Portions of the busbar assembly 320 thus extend outside of the housing assembly 300.

The housing assembly 300, fuse support structure 310, and a fuse system, together form a protective device in a compact fuse configuration. The protective device may thus be easily used in environments that require the use of a standard fuse. The protective device, however, provides an added advantage of remote current indication. A controller (not shown) may thus monitor the protective device to determine its functional status.

The housing assembly 300 not only enhances an ease of use of the protective device, but also provides a sealed structure for the fuse system. Sparks produced by the fuse system, in case of a high current, catastrophic failure, for instance, may be safely contained within the housing assembly 300. The protective device may thus be used safely in environments containing explosive gases (e.g., hydrogen environments).

Figure 4:
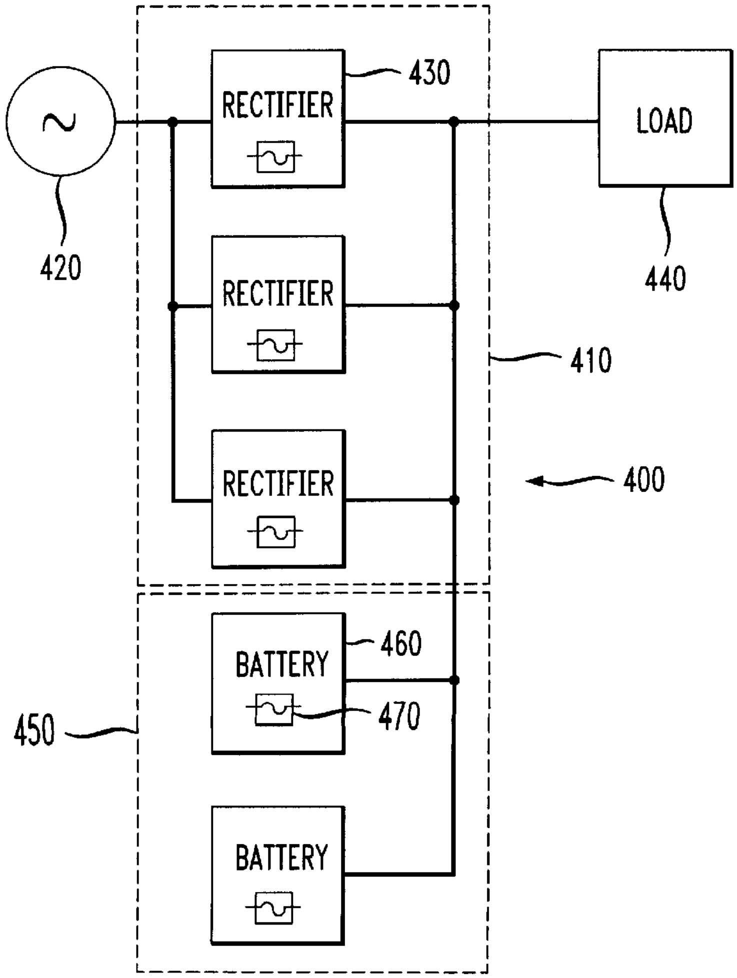
FIG. 4 illustrates a schematic, block diagram of a power distribution system employing a protective device constructed in accordance with the principles of the present invention.

Turning now to FIG. 4, illustrated is a schematice, block diagram of a power distribution system 400 employing a protective device 470 constructed in accordance with the principles of the present invention. The power distribution system 400 includes a power center 410, coupled to an external source of AC power 420. In the illustrated embodiment the power center 410 contains rectifiers (one of which is designated 430) that convert the AC power into DC power to power a load 440. Power center fuses associated with the power center 410 protect the rectifiers 430 from high current conditions.

The power distribution system 400 further includes a battery power source 450 coupled to the power center 410. In the illustrated embodiment, the battery power source 450 contains batteries (one of which is designated 460), that provide a source of backup power to the rectifiers 430 of the power center 410. The batteries 460 are typically mounted in battery stands (e.g., round cell stands or exide stands) in a battery room. Of course, any conventional method of mounting the batteries 460 may be used. The protective devices 470 may then be mounted to the battery stands to provide protection to the batteries located therein. The protective devices 470 are analogous to the protective devices described with respect to FIG. 2, and as a result, will not be discussed in detail.

The protection devices 470 thus protect the batteries 460 from high current faults. The protective devices 470 may also be monitored to determine an operational condition of the batteries 460, thereby enhancing the reliability of the power distribution system 400.

Although the present invention has been described in detail, those skilled in the art should understand that they can make various changes, substitutions and alterations herein without departing from the spirit and scope of the invention in its broadest form.

What is claimed is:

1. A protection device for an electrical circuit, comprising:

a housing assembly;

a fuse support structure couplable to said housing assembly, said fuse support structure comprised of a conductive material;

a main fuse mountable to said fuse support structure to receive a flow of current therefrom; and a trip fuse mechanically mounted on said main fuse by electrical contacts, said electrical contacts further forming a conductive path across said main fuse and through said trip fuse.

2. The protection device recited in claim 1 further comprising a momentary switch coupled to said trip fuse.

3. The protection device recited in claim 2 wherein said trip fuse is configured to activate said momentary switch when a predetermined excessive current flows through said trip fuse.

4. The protection device recited in claim 2 wherein said momentary switch is electrically connected to a current indicator, said current indicator configured to indicate when said excessive current flows through said trip fuse.

5. The protection device recited in claim 1 wherein said trip fuse is electrically connected to a current indicator, said current indicator configured to indicate when an excessive current flows through said trip fuse.

6. The protection device recited in claim 1 further comprising a block terminal mounted to said fuse support structure and electrically connected to said trip fuse, said block terminal providing an electrical connection point for a remote current indicator.

7. The protection device recited in claim 1 wherein said housing is a hollow cylindrical housing configured to receive said fuse support structure therethrough.

8. The protection device recited in claim 7 wherein said fuse support structure includes a substantially planar busbar assembly, said busbar assembly having opposing ends and a circular member near each of said opposing ends, said circular member having a diameter less than an interior diameter of said hollow cylindrical housing.

9. The protection device recited in claim 8 wherein opposing ends of said cylindrical housing are threaded and said cylindrical housing further includes threaded caps having openings therein, said threaded caps configured to engage said circular members to secure said fuse support structure within said cylindrical housing.

10. The protection device recited in claim 1 further comprising a sub-support structure coupled to said fuse support structure.

11. A protection device for an electrical circuit, comprising:

a hollow cylindrical housing;

a fuse support structure couplable to said cylindrical housing, said fuse support structure comprised of a conductive material and configured to be received through said cylindrical housing;

a main fuse mountable to said fuse support structure to receive a flow of current therefrom;

a trip fuse mechanically mounted to said main fuse by electrical contacts, said electrical contacts further forming a conductive path across said main fuse and through said trip fuse; and a momentary switch coupled to said trip fuse.

12. The protection device recited in claim 11 wherein said trip fuse is configured to activate said momentary switch when a predetermined excessive current flows through said trip fuse.

13. The protection device recited in claim 11 wherein said momentary switch is electrically connected to a current indicator, said current indicator configured to indicate when said excessive current flows through said trip fuse.

14. The protection device recited in claim 11 wherein said trip fuse is electrically connected to a current indicator, said current indicator configured to indicate when an excessive current flows through said trip fuse.

15. The protection device recited in claim 11 further comprising a block terminal mounted to said fuse support structure and electrically connected to said trip fuse, said block terminal providing an electrical connection point for a remote current indicator.

16. The protection device recited in claim 11 wherein said fuse support structure includes a substantially planar busbar assembly, said busbar assembly having opposing ends and a circular member near each of said opposing ends, said circular member having a diameter less than an interior diameter of said cylindrical housing.

17. The protection device recited in claim 16 wherein opposing ends of said cylindrical housing are threaded and said cylindrical housing further includes threaded caps having openings therein, said threaded caps configured to engage said circular members to secure said fuse support structure within said cylindrical housing.

18. The protection device recited in claim 17 where in said openings in said threaded caps have an inside diameters that are less than the diameter of said circular members and are configured to receive only a portion of said fuse support structure therethrough.

19. The protection device recited in claim 11 further comprising a sub-support structure coupled to said fuse support structure.

20. The protection device recited in claim 11 wherein said fuse support structure is comprised of aluminum.

21. A power distribution system, comprising:

a power center having a power center fuse electrically connected thereto near said power center, said power center electrically connectable to an external power source external to said power distribution system; and a battery power source electrically connected to said power center, said battery power source providing a current to said power center when an interruption of current from said external power source occurs, said battery power source including a protection device, comprising:

a housing assembly;

a fuse support structure couplable to said housing assembly, said fuse support structure comprised of a conductive material;

a main fuse mountable to said fuse support structure to receive a flow of current therefrom; and a trip fuse mechanically mounted on said main fuse by electrical contacts, said electrical contacts further forming a conductive path across said main fuse and through said trip fuse.

22. The power distribution system recited in claim 21 further comprising a momentary switch coupled to said trip fuse.

23. The power distribution system recited in claim 22 wherein said trip fuse is configured to activate said momentary switch when a predetermined excessive current flows through said trip fuse.

24. The power distribution system recited in claim 22 wherein said momentary switch is electrically connected to a current indicator, said current indicator configured to indicate when said excessive current flows through said trip fuse.

25. The power distribution system recited in claim 22 wherein said trip fuse is electrically connected to a current indicator, said current indicator configured to indicate when an excessive current flows through said trip fuse.

26. The power distribution system recited in claim 21 further comprising a block terminal mounted to said fuse support structure and electrically connected to said trip fuse, said block terminal providing an electrical connection point for a remote current indicator.

27. The power distribution system recited in claim 21 wherein said housing is a hollow cylindrical housing configured to receive said fuse support structure therethrough.

28. The power distribution system recited in claim 27 wherein said fuse support structure includes a substantially planar busbar assembly, said busbar assembly having opposing ends and a circular member near each of said opposing ends, said circular member having a diameter less than an interior diameter of said hollow cylindrical housing.

29. The power distribution system recited in claim 28 wherein opposing ends of said cylindrical housing are threaded and said cylindrical housing further includes threaded caps having openings therein, said threaded caps configured to engage said circular members to secure said fuse support structure within said cylindrical housing.

30. The power distribution system recited in claim 21 further comprising a sub-support structure coupled to said fuse support structure.

* * * * *